(12) United States Patent
Kwon et al.

(10) Patent No.: US 10,911,255 B2
(45) Date of Patent: Feb. 2, 2021

(54) DEVICES, METHODS, AND SYSTEMS FOR HANDS FREE FACILITY STATUS ALERTS

(71) Applicant: Honeywell International Inc., Morris Plains, NJ (US)

(72) Inventors: Dae-Soon Kwon, North Ryde (AU); Gary Fuller, North Parramatta (AU); Paul Vanderstraeten, North Ryde (AU); Andie Kurniawan, Mascot (AU); Yi-Chang Hsieh, Cammeray (AU); Martin Lee, Lane Cove (AU)

(73) Assignee: Honeywell International Inc., Charlotte, NC (US)

( * ) Notice: Subject to any disclaimer, the term of this patent is extended or adjusted under 35 U.S.C. 154(b) by 101 days.

(21) Appl. No.: 15/168,860

(22) Filed: May 31, 2016

(65) Prior Publication Data

US 2017/0345283 A1    Nov. 30, 2017

(51) Int. Cl.
| | | |
|---|---|---|
| *G05B 15/02* | (2006.01) | |
| *G05B 23/02* | (2006.01) | |
| *H04L 12/28* | (2006.01) | |
| *G06F 1/16* | (2006.01) | |

(52) U.S. Cl.
CPC .......... *H04L 12/2816* (2013.01); *G05B 15/02* (2013.01); *G05B 23/0267* (2013.01); *G06F 1/163* (2013.01); *H04L 12/2825* (2013.01); *G05B 2219/2642* (2013.01)

(58) Field of Classification Search
None
See application file for complete search history.

(56) References Cited

U.S. PATENT DOCUMENTS

| | | | | |
|---|---|---|---|---|
| 5,950,150 A | * | 9/1999 | Lloyd | A62C 37/50 340/506 |
| 6,292,717 B1 | * | 9/2001 | Alexander | G01R 19/2513 340/6.1 |
| 6,556,222 B1 | * | 4/2003 | Narayanaswami | G04G 9/0064 368/295 |
| 6,757,714 B1 | * | 6/2004 | Hansen | G06F 11/2294 709/206 |
| 7,081,905 B1 | * | 7/2006 | Raghunath | G04G 5/00 345/684 |
| 8,090,477 B1 | * | 1/2012 | Steinberg | G05D 23/1923 700/278 |
| 8,384,617 B2 | * | 2/2013 | Braun | G09G 5/00 345/7 |

(Continued)

FOREIGN PATENT DOCUMENTS

GB         2469327 A  * 10/2010  ......... G01C 21/3484

*Primary Examiner* — Steven Lim
*Assistant Examiner* — Muhammad Adnan
(74) *Attorney, Agent, or Firm* — Seager Tufte & Wickhem LLP

(57) ABSTRACT

Devices, methods, and systems for hands free facility status alerts are described herein. One system includes a computing device for hands free building automation notifications, comprising a memory and a processor to execute executable instructions stored in the memory to: receive a notification of an event from a building automation system, modify the notification to include only pre-defined attributes of the notification that are displayable on a user interface of a wearable device, and transmit the modified notification to the wearable device.

20 Claims, 8 Drawing Sheets

(56) References Cited

U.S. PATENT DOCUMENTS

| | | | | |
|---|---|---|---|---|
| 9,021,375 B2* | 4/2015 | Balasubramanian | ... | G06F 9/451 715/772 |
| 9,061,639 B2* | 6/2015 | Mack | ... | B60R 21/0132 |
| 9,070,266 B2* | 6/2015 | Shigeyama | ... | G08B 23/00 |
| 9,173,052 B2* | 10/2015 | Hauser | ... | H04W 4/206 |
| 9,652,972 B1* | 5/2017 | Lobo | ... | H04L 41/0627 |
| 9,766,959 B2* | 9/2017 | Faaborg | ... | G06F 9/546 |
| 9,839,101 B2* | 12/2017 | Clymer | ... | G06F 3/0412 |
| 10,282,078 B2* | 5/2019 | Choi | ... | G06F 3/04847 |
| 10,345,781 B2* | 7/2019 | Sinha | ... | G08B 21/0453 |
| 10,459,680 B2* | 10/2019 | Itasaka | ... | G06F 3/014 |
| 10,470,671 B2* | 11/2019 | Braun | ... | A61B 5/0008 |
| 2003/0188189 A1* | 10/2003 | Desai | ... | H04L 63/104 726/23 |
| 2006/0077607 A1* | 4/2006 | Henricks | ... | G06Q 10/06 361/93.1 |
| 2008/0183744 A1* | 7/2008 | Adendorff | ... | G06Q 10/10 |
| 2009/0057428 A1* | 3/2009 | Geadelmann | ... | G05B 15/02 236/51 |
| 2010/0102948 A1* | 4/2010 | Grohman | ... | G05B 23/027 340/506 |
| 2013/0234840 A1* | 9/2013 | Trundle | ... | G08C 19/16 340/12.53 |
| 2013/0346882 A1* | 12/2013 | Shiplacoff | ... | G06F 3/04842 715/753 |
| 2014/0075321 A1* | 3/2014 | Masera | ... | H04L 41/022 715/736 |
| 2014/0089035 A1* | 3/2014 | Jericho | ... | G07C 5/008 705/7.26 |
| 2014/0143678 A1* | 5/2014 | Mistry | ... | G06F 3/017 715/746 |
| 2014/0200718 A1* | 7/2014 | Tessier | ... | G05D 23/1902 700/276 |
| 2014/0207292 A1* | 7/2014 | Ramagem | ... | G05D 23/1902 700/278 |
| 2014/0316585 A1* | 10/2014 | Boesveld | ... | G05D 23/1902 700/278 |
| 2014/0334271 A1* | 11/2014 | Park | ... | G04G 21/04 368/10 |
| 2015/0066616 A1* | 3/2015 | Bray | ... | G06Q 30/0214 705/14.16 |
| 2015/0127165 A1* | 5/2015 | Quam | ... | F24F 11/63 700/275 |
| 2015/0163945 A1* | 6/2015 | Barton | ... | G05B 15/02 361/809 |
| 2015/0294627 A1* | 10/2015 | Yoo | ... | G06F 3/147 345/690 |
| 2015/0355036 A1* | 12/2015 | Giorgi | ... | H04L 12/2825 702/130 |
| 2015/0382321 A1* | 12/2015 | Ryu | ... | H04W 68/02 455/458 |
| 2016/0012707 A1* | 1/2016 | McKinley | ... | G08B 25/10 340/679 |
| 2016/0066298 A1* | 3/2016 | Cho | ... | H04W 68/02 455/414.1 |
| 2016/0080888 A1* | 3/2016 | Kreitzer | ... | H04B 1/385 455/39 |
| 2016/0134737 A1* | 5/2016 | Pulletikurty | ... | G06F 3/0227 715/735 |
| 2016/0147222 A1* | 5/2016 | Haberl | ... | B60W 50/14 701/2 |
| 2016/0147713 A1* | 5/2016 | Ni | ... | G06T 3/40 345/660 |
| 2016/0163186 A1* | 6/2016 | Davidson | ... | G06Q 50/16 340/506 |
| 2016/0239001 A1* | 8/2016 | Chin | ... | G07C 9/00309 |
| 2016/0261425 A1* | 9/2016 | Horton | ... | G05B 15/02 |
| 2016/0282824 A1* | 9/2016 | Smallwood | ... | G06F 1/163 |
| 2016/0320849 A1* | 11/2016 | Koo | ... | G06F 3/017 |
| 2016/0335731 A1* | 11/2016 | Hall | ... | G06Q 50/163 |
| 2016/0341435 A1* | 11/2016 | Rabb | ... | F24F 11/30 |
| 2017/0102855 A1* | 4/2017 | Kwon | ... | G06F 3/04886 |
| 2017/0269792 A1* | 9/2017 | Xu | ... | G06F 3/0481 |
| 2017/0289087 A1* | 10/2017 | Chang | ... | H04L 51/24 |
| 2017/0289954 A1* | 10/2017 | Mese | ... | H04W 68/00 |
| 2017/0321923 A1* | 11/2017 | Wiens-Kind | ... | G05B 19/048 |
| 2018/0005506 A1* | 1/2018 | Anderson | ... | G08B 21/182 |
| 2018/0062869 A1* | 3/2018 | Nugent | ... | H04L 12/282 |

* cited by examiner

US 10,911,255 B2

DEVICES, METHODS, AND SYSTEMS FOR HANDS FREE FACILITY STATUS ALERTS

TECHNICAL FIELD

The present disclosure relates to devices, methods, and systems for hands free facility status alerts.

BACKGROUND

Building automation systems can be complex distributed systems. For example, a building automation system can include many different pieces of equipment. As a specific example, a building automation system can include different pieces of heating, ventilation, and air-conditioning (HVAC) equipment as well as other equipment such as sensors, operating panels, controllers, actuators, etc.

The different pieces of equipment included in a building automation system can generate alarms that can notify a user, such as a building manager, of abnormalities in the building automation system. For example, a piece of equipment included in the building automation system, such as a piece of HVAC equipment, may generate an alarm in response to a fault in the HVAC equipment. The alarm may be sent to a mobile device associated with the user by the building automation system.

DETAILED DESCRIPTION

Figure 1:
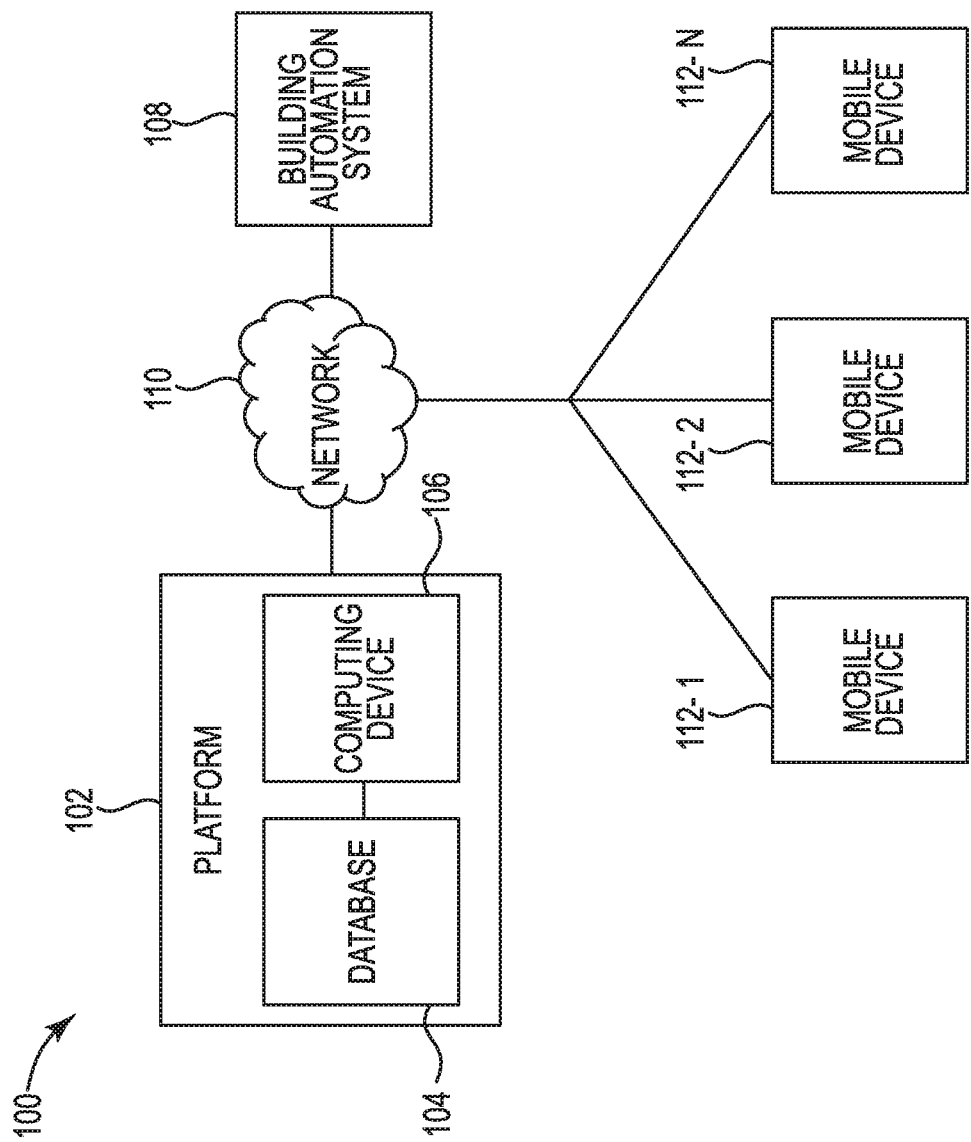
FIG. 1 is an example of a system for hands free facility status alerts according to one or more embodiments of the present disclosure.

Devices, methods, and systems for hands free facility status alerts are described herein. One system includes a computing device for hands free building automation notifications, comprising a memory and a processor to execute executable instructions stored in the memory to: receive a notification of an event from a building automation system, modify the notification to include only pre-defined attributes of the notification that are displayable on a user interface of a wearable device, and transmit the modified notification to the wearable device.

The devices, methods, and systems for hands free facility status alerts described herein can be utilized to more efficiently deliver status information of a facility such as an area or building. In some examples, the devices within the facility can be monitored and/or controlled by a building automation system. The building automation system can be utilized to send notifications to a plurality of client devices (e.g., mobile device, computing device, etc.). For example, the building automation system can determine that an event has occurred for a particular device or system within the facility. In this example, the building automation system can determine that a device is malfunctioning and can send a notification to the plurality of client devices.

In some examples, the building automation system or a platform coupled to the building automation system can modify a notification to include only pre-defined attributes of the notification that are displayable on a user interface of a wearable device. For example, the platform can modify the notification to include: a source, a priority level of the notification, a category that defines a type of the notification, and/or a brief description of an event that initiated the notification. In some examples, the user interface can be utilized to receive a selection to display categorized data of the notification from an event table corresponding to the event.

In some examples, the devices, methods, and systems for hands free facility status alerts described herein can be utilized to notify a user of a wearable device such that the user can be notified while performing other tasks. For example, the user can be notified of an event detected by the building automation system while working on a system monitored by the building automation system. In this example, the event can relate to the work being performed by the user. In this example, the user can utilize the user interface of the wearable device to transmit a message to the building automation system updating a status of the event. In this example, the building automation system can send updates within the same event table as the original notification. Thus, the devices, methods, and systems for hands free facility status alerts described herein can provide real time status updates for events that trigger a notification from the building automation system.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

FIG. 1 is an example of a system 100 for hands free facility status alerts according to one or more embodiments of the present disclosure. As shown in FIG. 1, the system 100 includes a platform 102, a building automation system 108, a network 110, and a number of mobile devices 112-1, 112-2, 112-N. Platform 102 can include a database 104 and computing device 106.

Computing device 106 can receive a notification of an alarm from building automation system 108. For example, computing device 106 can receive an alarm relating to a fault that may be occurring in building automation system 108. For instance, a fault in a piece of HVAC equipment, such as a stuck valve, may be occurring that causes an alarm to be generated and sent to building automation system 108. Computing device 106 can send the notification of the alarm to the number of mobile devices 112-1, 112-2, and/or 112-N via network 110.

As used herein, a fault can include an event that occurs to cause a piece of equipment and/or a control strategy of a building to function improperly or to cause abnormal behavior in a building, or a zone of the building, serviced by building automation system 108. In some examples, a fault can include a piece of equipment breaking down. In some examples, a fault can include a component of a piece of equipment ceasing to function correctly. In some examples, a fault can include abnormal behavior of a piece of equipment and/or a zone.

Although a fault is described as including equipment breakdowns and abnormal behavior, embodiments of the disclosure are not so limited. For example, faults can include any other event that causes equipment or control strategies to function improperly, and/or causes abnormal behavior to occur in a building serviced by building automation system 108.

As used herein, an alarm can include a notification of a fault or event. For example, a fault may be detected by a physical and/or inferential sensor, where the physical and/or inferential sensor sends a signal to building automation system 108 in response to detection of a fault. Building automation system 108 can generate an alarm to notify a user of building automation system 108, such as a building owner, building manager, engineer, and/or other personnel.

As shown in FIG. 1, computing device 106 can be included in platform 102. Platform 102 can receive notifications of a number of alarms from building automation system 108 via network 110, where platform 102 includes computing device 106 and database 104.

Network 110 can be a wired or wireless network that connects building automation system 108, platform 102, and the number of mobile devices 112-1, 112-2, 112-N. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

In some examples, the platform 102 can be utilized to modify notifications received from the building automation system 108. For example, the platform 102 can utilize the computing device 106 to modify the notification to include only pre-defined attributes of the notification that are displayable on a user interface of a wearable device. In some examples, the building automation system 108 can modify the generated notifications to include only pre-defined attributes of the notification that are displayable on the user interface of the wearable device. For example, the building automation system 108 can have a direct communication channel with the mobile devices 112-1, 112-2, 112-N to send the modified notifications to the mobile devices 112-1, 112-2, 112-N.

In some examples, the mobile devices 112-1, 112-2, 112-N can be wearable devices. In some examples, a wearable device can include a device that can be worn by a user. In some examples, the wearable device can be attached to a user such that the user can utilize both hands while the wearable device is attached to the user. In some examples, the wearable device can be attached via a physical strap or pin that can attach the wearable device to the user. In some examples, the wearable device can include, but is not limited to: a smartwatch, a pin, an arm band, a wrist band, among other devices that can be worn by the user. In some examples, the wearable device can include a processor, memory with instructions that can be executed by the processor, and/or a user interface as described herein.

In some examples, the mobile devices 112-1, 112-2, 112-N or wearable devices can utilize a number of signals to notify a user when a notification is received. For example, the wearable devices can utilize a sound notification to notify a user that a notification was received from the platform or building automation system. In some examples, the wearable devices can utilize a haptic notification to notify a user when a notification is received. For example, the wearable devices can vibrate to notify a user that a notification was received from the platform 102 or building automation system 108. In some examples, the wearable devices can display a light (e.g., color coded light, colored light emitting diode, etc.) to notify a user that a notification was received from the platform 102 or building automation system 108.

In some examples, the platform 102 can be utilized to transmit the modified notification to the wearable device and/or the mobile devices 112-1, 112-2, 112-N. In some examples, the platform 102 can determine a portion of the mobile devices 112-1, 112-2, 112-N to transmit the modified notification. For example, the platform 102 can determine a number of users that have a relationship to the notification and send the modified notification to mobile devices 112-1, 112-2, 112-N that correspond to the number of users. For example, the notification can relate to an event such as a measured flow of a heater being above or below a threshold value. In this example, the platform 102 can determine a number of users that are related to the HVAC system, the heating system, the heater, and/or the pump corresponding to the heater. In some examples, technicians and managers that are responsible for maintaining or installing the HVAC system can be sent the notification while other users that may not be involved with maintaining or installing the HVAC system are not sent the notification.

In some examples, the mobile devices 112-1, 112-2, 112-N can be wearable devices with a relatively smaller user interface surface compared to other mobile devices (e.g., cell phone, laptop, tablet, etc.). In these examples, the platform 102 can modify a notification received from the building automation system 108 to fit within the relatively smaller user interface surface. For example, the platform 102 can modify the notification to include only pre-defined attributes of the notification that are displayable on a user interface of a wearable device.

The pre-defined attributes can provide sufficient information to a user such that the user can identify a source of the notification, identify a priority level of the notification, identify a category of the notification, and/or identify a brief description of the notification on the user interface of the wearable device. In some examples, the pre-defined attributes can include a source of the event notification that defines an issue (e.g., event, fault, etc.) detected by the building automation system. In some examples, the source of the event can include a description of the issue that fits within the user interface of the wearable device. For example, code or short hand description can be utilized to describe a physical location and/or physical device that is associated with the event. In some examples, the event can be triggered by sensor data associated with a physical device and the source can include a description and/or location of the physical device.

In some examples, the pre-defined attributes can include a priority level corresponding to the notification. In some examples, the priority level corresponding to the notification can include a pre-defined priority level based on an urgency of the event associated with the notification. For example, the priority level can be based on how important it is to respond to the notification in a timely manner. In this example, a higher priority level (e.g., a more important event, etc.) can correspond to an event where a faster response time is required. For example, the event can be a device failure. In this example, the device failure may cause damage to other devices or other objects within the area. In this example, the event can have a relatively higher priority level since a faster response time can save costs or prevent potential damage to other objects or devices within the facility. Similarly, a lower priority level (e.g., less important event, etc.) can correspond to an event that may not require a fast response time, but may be an event that indicates a particular device or area may need maintenance at some point to prevent a failure.

In some examples, the pre-defined attributes can include a category that defines a type of the notification. In some examples, the category can define whether the notification corresponds to a device failure, a maintenance reminder, a project update, and/or other type of notification. In some examples, the category can be utilized to determine a number of users to receive the notification. For example, the category of the notification can define particular skill sets that may be useful in responding to the event. In some examples, the category can be utilized to identify a type of response requested from the user of the wearable device. For example, the category can help a manager identify other users to contact for technical support. In this example, the category can help a technician determine what type of equipment may be needed to respond to the event.

In some examples, the pre-defined attributes can include trend information that defines data over a period of time corresponding to the notification. In some examples, the trend information can include sensor data collected by the building automation system 108 for a device or area associated with the event. In some examples, the trend information can be utilized to identify why the building automation system 108 transmitted a notification to the platform 102. In some examples, the trend information is displayable as a graphical representation. For example, the sensor data can include temperature data for a heater. In this example, the graphical representation can include temperature data collected by sensors over a period of time.

In some examples, the platform 102 can receive feedback from the user interface of the wearable device or the mobile devices 112-1, 112-2, 112-N. In some examples, the platform 102 can upload the feedback to the building automation system 108. In some examples, the feedback can be generated utilizing a text message or voice message converted to a text message.

In some examples, the feedback can be a snooze or close selection as described herein. For example, the platform 102 can receive a snooze indication from the user interface of the wearable device to delay further notifications relating to the event. In this example, the notification can be displayed in an event table where multiple different notifications can be categorized or organized. In some examples, the snooze indication can include a time period to define a quantity of time to block additional notifications that relate to similar events that initiated the original notification. In some examples, the feedback can include a response to the notification to update other users or other mobile devices 112-1, 112-2, 112-N.

In some examples, the platform 102 can receive the feedback from the wearable device and transmit the feedback to the building automation system 108. For example, the platform 102 can update the building automation system 108 with the feedback provided by a number of different users. In this example, the updates to the building automation system 108 can be utilized to send additional notifications relating to the event back to the platform 102. In this example, the platform 102 can modify the updated notifications as described herein to be displayed on the user interface of a wearable device.

The system 100 as described herein can be utilized to provide hands free notifications to a plurality of users associated with a building automation system 108. The notifications from the building automation system 108 can be modified by the platform 102 to provide just enough information to assess the source and urgency of an event associated with the notification. The system 100 can also provide a user with the option to provide feedback to the notification. As described herein, the feedback can provide additional information or additional directions for responding to the event. Thus, the system 100 can provide real time status information for a number of events monitored and/or controlled by the building automation system 108 on a user interface of a wearable device.

Figure 2:
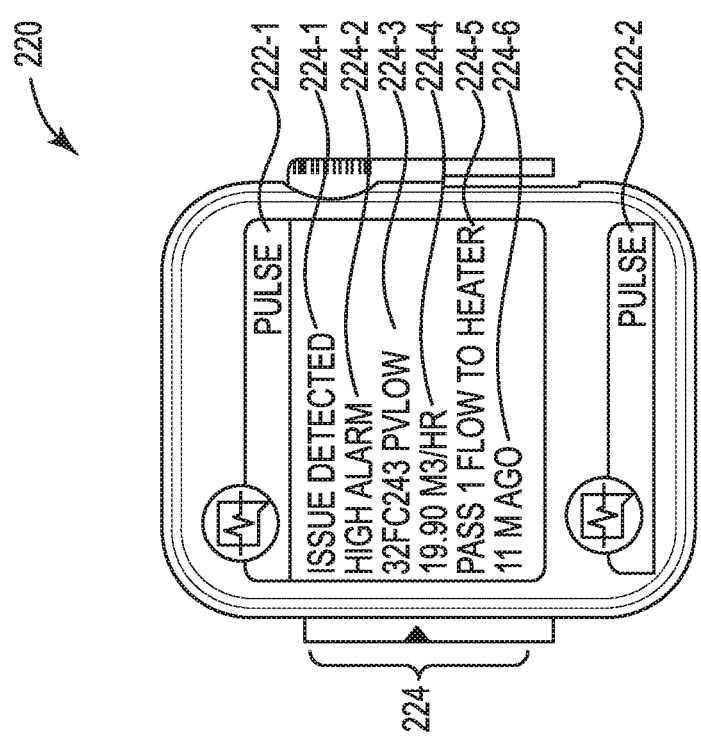
FIG. 2 is an example of a display for hands free facility status alerts according to one or more embodiments of the present disclosure.

FIG. 2 is an example of a display 220 for hands free facility status alerts according to one or more embodiments of the present disclosure. In some examples, the display 220 can be a user interface of a wearable device. For example, the display 220 can be a user interface of a smart watch that utilizes a computing device to provide the functions described herein.

In some examples, the display 220 can be relatively smaller in size compared to other mobile devices. In some examples, the display 220 can include an event table that includes a plurality of notifications 222-1, 222-2 that each correspond to a different event. Within each notification 222-1, 222-2 there can be a number of pre-defined attributes 224. For example, the notification 222-1 can include a number of pre-defined attributes 224-1, 224-2, 224-3, 224-3, 224-4, 224-5, 224-6 that each provide pre-defined information associated with the notification 222-1.

In some examples, the pre-defined attributes 224 can include a source attribute 224-1 to define a source of the notification 222-1. In some examples, the source attribute 224-1 can provide a brief description of the issue detected by a building automation system. In some examples, the source attribute 224-1 can identify a general type of issue detected. In some examples, the pre-defined attributes 224 can include a priority level attribute 224-2. As described herein, the priority level attribute 224-2 can define an importance of responding to the event associated with the notification 222-1. In some examples, the priority level attribute 224-2 can indicate a suggested time period for responding to the event associated with the notification 222-1.

In some examples, the pre-defined attributes 224 can include a category attribute 224-3. In some examples, the category attribute 224-3 can identify a type of notification and/or a type of event that triggered the notification 222-1. For example, the category attribute 224-3 can include a description of the device that is associated with the event and/or the sensor that triggered the event.

In some examples, the pre-defined attributes 224 can include a condition attribute 224-4 that can indicate real time data corresponding to the event. In some examples, the condition attribute 224-4 can include a value detected by the sensor and/or device as described herein. For example, the condition attribute 224-4 can include a flow rate detected by a sensor coupled to a heater or chiller.

In some examples, the pre-defined attributes 224 can include a description attribute 224-5 that can include a brief description of the event and/or a brief description of why the notification 222-1 was transmitted to the platform from the building automation system. For example, the description attribute 224-5 can describe that a pump or flow rate to a heater is above or below a threshold value.

In some examples, the pre-defined attributes 224 can include a timestamp attribute 224-6. In some examples, the timestamp attribute 224-6 can be a date and time that an event or alarm was determined by the building automation system. In some examples, the timestamp attribute 224-6 can include a date and time that the notification 222-1 was sent by the platform. In some examples, the timestamp attribute 224-6 can include a quantity of time since the notification 222-1 was received at the wearable device. In some examples, the timestamp attribute 224-6 can indicate a date and time of an update to the notification 222-1 and/or indicate a quantity of time since the most recent update to the notification 222-1.

Figure 3:
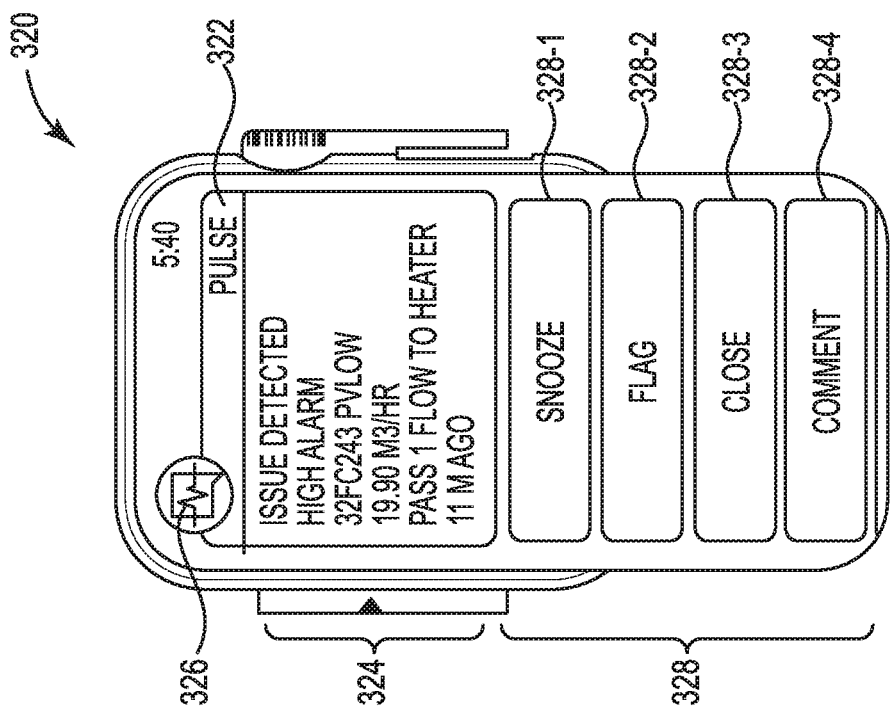
FIG. 3 is an example of a display for hands free facility status alerts according to one or more embodiments of the present disclosure.

FIG. 3 is an example of a display 320 for hands free facility status alerts according to one or more embodiments of the present disclosure. In some examples, the display 320 can be displayed on a user interface of the same or similar user interface of a wearable device as described herein. In some examples, the display 320 can include a notification 322 with corresponding pre-defined attributes 324. In some examples, the display 320 can also include an update selection tool 326. In some examples, selecting the update selection tool 326 can display a number of update attributes 328.

In some examples, the update attributes 328 can include a number of selectable attributes 328-1, 328-2, 328-3, 328-4. In some examples, the update attributes 328 can include a selectable snooze attribute 328-1. As described herein, the selectable snooze attribute 328-1 can delay additional notifications relating to the notification 322 for a period of time. In some examples, the snooze attribute 328-1 can include an option to select the period of time to delay additional notifications. That is, the snooze attribute can include a time period to define a quantity of time to block notifications relating to the notification 322.

In some examples, the update attributes 328 can include a selectable flag attribute 328-2. In some examples, the selectable flag attribute 328-2 can generate a flag for the notification 322. In some examples, the flag can be used to organize a plurality of notifications including the notification 322. In some examples, the flag can allow a user to identify the notification 322 from a plurality of notifications.

In some examples, the update attributes 328 can include a selectable close attribute 328-3. In some examples, the selectable close attribute 328-3 can be selected to close the notification 322 and/or delete the notification from an event table that includes a plurality of notifications including the notification 322. In some examples, the selectable close notification can be utilized to organize notifications within the event table by removing notifications that have been addressed and/or are no longer applicable for a particular user.

In some examples, the update attributes 328 can include a selectable comment attribute 328-4. In some examples, the selectable comment attribute 328-4 can be utilized to generate a comment or message corresponding to the notification 322. In some examples, the selectable comment attribute 328-4 can be utilized to generate feedback in response to the notification 322. In some examples, the generated message or feedback can be transmitted to the platform and/or the building automation system. In some examples, the message or feedback can be distributed to other wearable devices when the building automation system is updated. In some examples, the message or feedback can be utilized to instruct other users how to respond to the notification 322.

Figure 4:
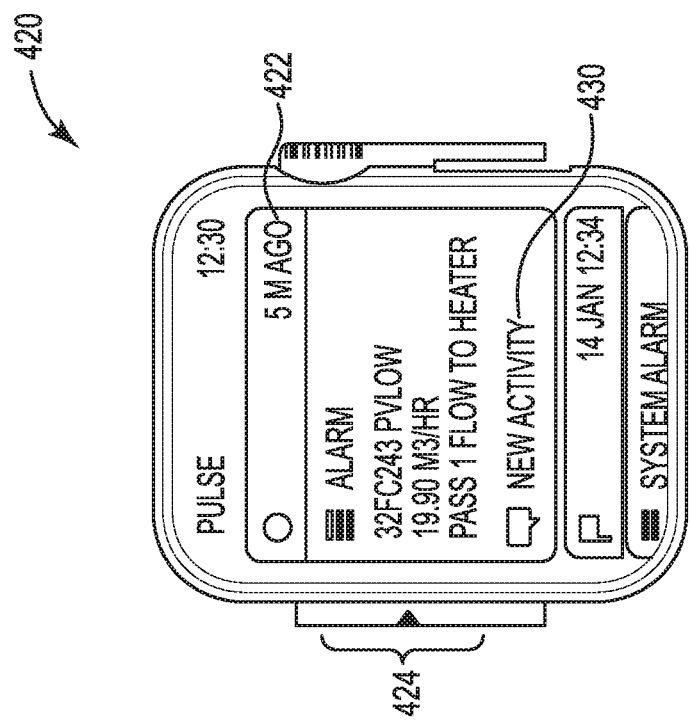
FIG. 4 is an example of a display for hands free facility status alerts according to one or more embodiments of the present disclosure.

FIG. 4 is an example of a display 420 for hands free facility status alerts according to one or more embodiments of the present disclosure. In some examples, the display 420 can be displayed on the same or similar user interface of a wearable device as described herein. In some examples, the display 420 can include a notification 422 with corresponding pre-defined attributes 424. In some examples, the notification 422 can include a new activity tab 430.

In some examples, the new activity tab 430 can include updates associated with the notification 422. As described herein, a number of users can provide messages and/or updates for the notification 422. In some examples, the new activity tab 430 can be a selectable tab to display the messages and/or the updates when selected. As described herein, the messages and/or the updates can be snoozed when a snooze selectable attribute is selected.

Figure 5:
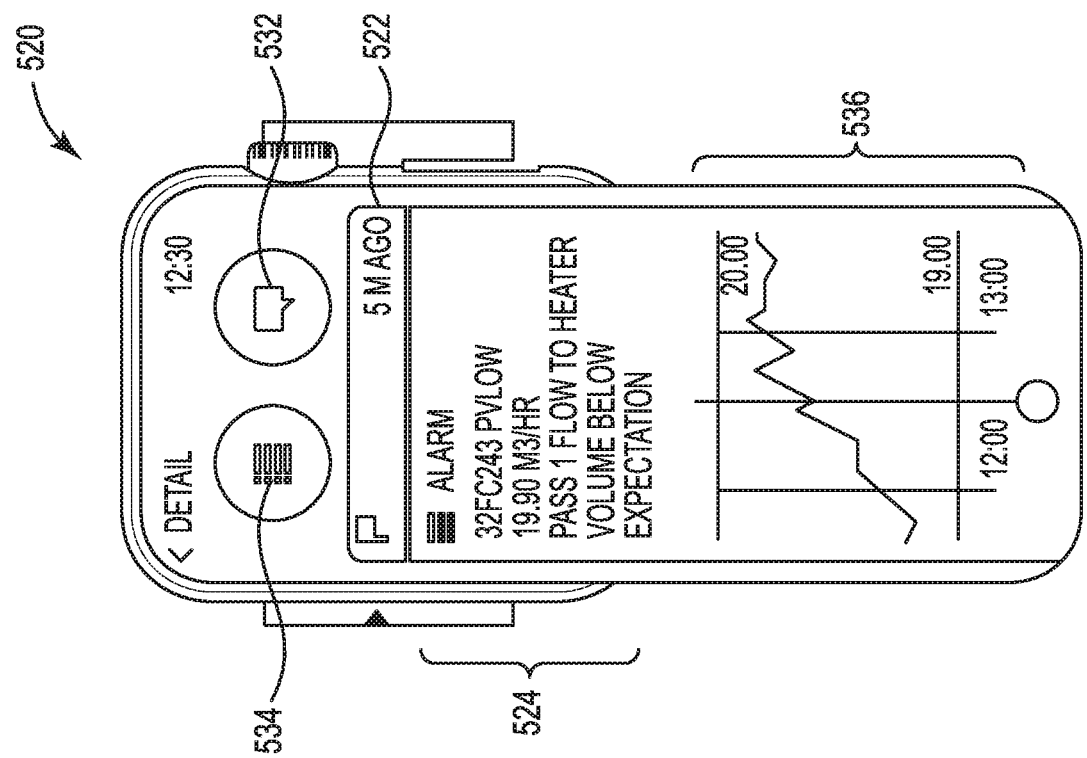
FIG. 5 is an example of a display for hands free facility status alerts according to one or more embodiments of the present disclosure.

FIG. 5 is an example of a display 520 for hands free facility status alerts according to one or more embodiments of the present disclosure. In some examples, the display 520 can be displayed on the same or similar user interface of a wearable device as described herein. In some examples, the display 520 can include a notification 522 with corresponding pre-defined attributes 524.

In some examples, the display 520 can include a modified notification that includes a graphical representation 536 of the event over a period of time. As described herein, the graphical representation 536 can include sensor data for a particular device or area that corresponds to the event. For example, the sensor data can include temperature readings of a heater or cooling device over a period of time. The graphical representation 536 can be utilized to determine how the sensor data resulted in the event identified by the building automation system.

In some examples, the display 520 can include a selectable comment attribute 532 and/or a selectable menu attribute 534. In some examples, the comment attribute 532 can be utilized to generate a message and/or feedback as described herein. In some examples, the comment attribute 532 can be utilized to generate a message and/or feedback in response to the graphical representation 536. In some examples, the selectable menu attribute 534 can be utilized to display other selectable attributes as described herein. In some examples, the comment attribute 532 can be utilized to send a message or feedback directly to a different mobile device or wearable device.

Figure 6:
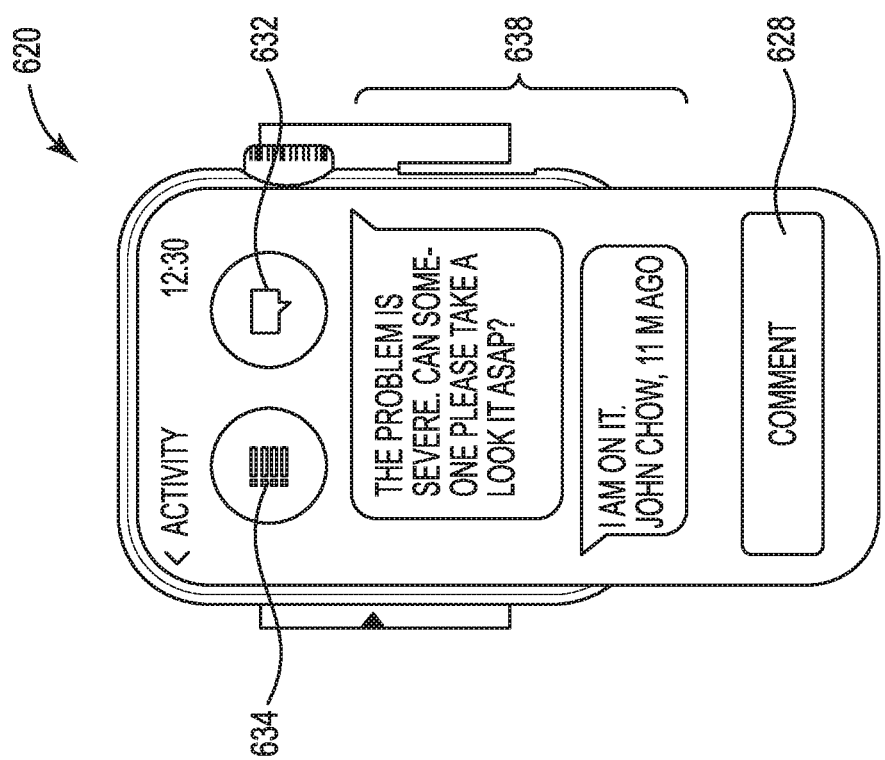
FIG. 6 is an example of a display for hands free facility status alerts according to one or more embodiments of the present disclosure.

FIG. 6 is an example of a display 620 for hands free facility status alerts according to one or more embodiments of the present disclosure. In some examples, the display 620 can be displayed on the same or similar user interface of a wearable device as described herein. In some examples, the display 620 can include a notification with corresponding pre-defined attributes. In some examples, the display 620 can include a number of messages 638 corresponding to the notification.

In some examples, the display 620 can include a selectable comment attribute 632 and/or a selectable menu attribute 634 as described herein. In some examples, the comment attribute 632 can be utilized to generate a message to respond to the number of messages 638. In some examples, the display 620 can include a selectable comment attribute 628 for updating the building automation system as described herein.

Figure 7:
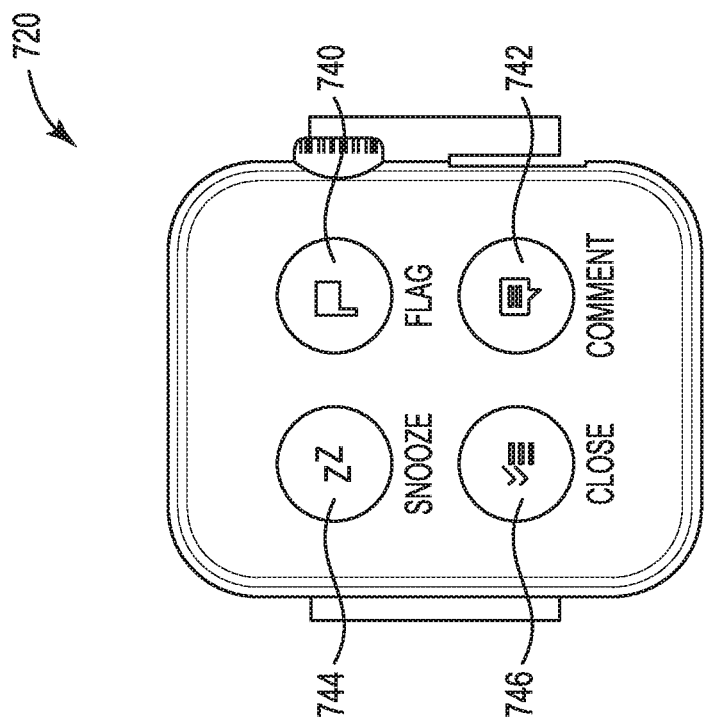
FIG. 7 is an example of a display for hands free facility status alerts according to one or more embodiments of the present disclosure.

FIG. 7 is an example of a display 720 for hands free facility status alerts according to one or more embodiments of the present disclosure. In some examples, the display 720 can be displayed on the same or similar user interface of a wearable device as described herein. In some examples, the display 720 can include a notification with corresponding pre-defined attributes. In some examples the pre-defined attributes can be displayed as a selectable snooze attribute 744, a selectable flag attribute 740, a selectable close attribute 746, and/or a selectable comment attribute 742.

Figure 8:
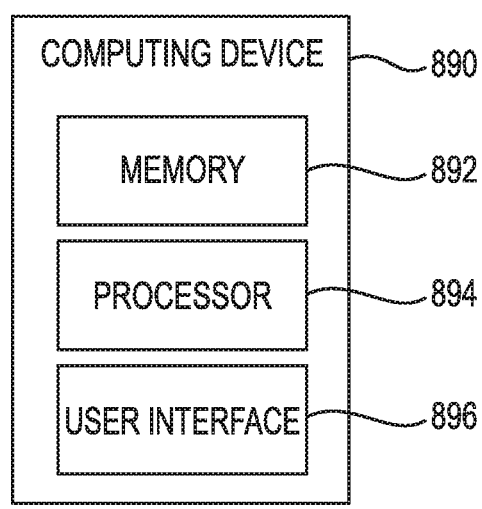
FIG. 8 is an example of a computing device for hands free facility status alerts according to one or more embodiments of the present disclosure.

FIG. 8 is an example of a computing device 890 for multi-user commissioning according to one or more embodiments of the present disclosure. Computing device 890 can be, for example, a commodity server, a data center that comprises a plurality of servers, among other types of computing devices or embedded system. Computing device 890 can be utilized in system 100, displays 220, 320, 420, 520, 620, 720, and/or methods described herein to perform the functions previously described herein. For example, computing device 890 can be included in a mobile device such as mobile computing device 112 as referenced in FIG. 1.

As shown in FIG. 8, computing device 890 includes a memory 892 and a processing resource 894 (e.g., processor) coupled to memory 892. Memory 892 can be any type of storage medium that can be accessed by processing resource 894 to perform various examples of the present disclosure. For example, memory 892 can be a non-transitory computer readable medium having computer readable instructions (e.g., computer program instructions) stored thereon that are executable by processing resource 894 to perform localizing a fault on a live cable in accordance with one or more embodiments of the present disclosure.

Memory 892 can be volatile or nonvolatile memory. Memory 892 can also be removable (e.g., portable) memory, or non-removable (e.g., internal) memory. For example, memory 892 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 892 is illustrated as being located in computing device 890, embodiments of the present disclosure are not so limited. For example, memory 892 can also be located internal to another computing resource (e.g., enabling computer readable instructions to be downloaded over the Internet or another wired or wireless connection).

As shown in FIG. 8, computing device 890 can also include a user interface 896. User interface 896 can include, for example, a display (e.g., a screen). The display can be, for instance, a touch-screen (e.g., the display can include touch-screen capabilities). User interface 896 (e.g., the display of user interface 896) can provide (e.g., display and/or present) information to a user of computing device 890. In some examples, the user interface 896 can be a user interface of a wearable device.

Additionally, computing device 890 can receive information from the user of computing device 890 through an interaction with the user via user interface 896. For example, computing device 890 (e.g., the display of user interface 896) can receive input from the user via user interface 896. The user can enter the input into computing device 890 using, for instance, a mouse and/or keyboard associated with computing device 890, or by touching the display of user interface 896 in embodiments in which the display includes touch-screen capabilities (e.g., embodiments in which the display is a touch screen).

As used herein, "a" or "a number of" something can refer to one or more such things. For example, "a number of resources" can refer to one or more resources. Additionally, the designator "N", as used herein, particularly with respect to reference numerals in the drawings, indicates that a number of the particular feature so designated can be included with a number of embodiments of the present disclosure.

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for hands free building automation notifications, comprising a memory and a processor to execute executable instructions stored in the memory to:
   receive a notification of an event from a building automation system, the received notification having a plurality of attributes related to the event;
   modify the notification to include only pre-defined ones of the plurality of attributes of the notification and to tailor the pre-defined attributes to be displayable on a relatively smaller user interface of a wearable device, wherein the pre-defined ones of the plurality of attributes include less than all of the plurality of attributes of the notification and two or more of a source of the event notification that defines an issue detected by the building automation system, a priority level corresponding to the event notification, a category that defines a type of the notification, and trend information that defines data over a period of time corresponding to the event notification;
   transmit the modified notification that includes only the pre-defined ones of the plurality of attributes of the notification to the wearable device for display on the relatively smaller user interface of the wearable device;
   receive feedback transmitted by the wearable device that includes an input from the user of the wearable device for responding to the event from the building automation system;
   update the building automation system based on the received feedback;
   update the modified notification based on the updated building automation system; and
   transmit the updated modified notification to the wearable device.

2. The computing device of claim 1, wherein the pre-defined ones of the plurality of attributes include a source of the event notification that defines an issue detected by the building automation system.

3. The computing device of claim 1, wherein the pre-defined ones of the plurality of attributes include a priority level corresponding to the event notification.

4. The computing device of claim 1, wherein the pre-defined ones of the plurality of attributes include a category that defines a type of the notification.

5. The computing device of claim 1, wherein the pre-defined ones of the plurality of attributes include trend information that defines data over a period of time corresponding to the event notification.

6. The computing device of claim 5, wherein the trend information is displayable as a graphical representation.

7. The computing device of claim 1, wherein at least one of the pre-defined ones of the plurality of attributes is abbreviated relative to the associated one of the plurality of attributes.

8. The computing device of claim 1, wherein the processor is configured to execute the executable instructions to upload the feedback to the building automation system.

9. The computing device of claim 1, wherein the processor is configured to execute the executable instructions to receive a snooze indication from the user interface of the wearable device to delay further notifications relating to the event.

10. The computing device of claim 9, wherein the snooze indication includes a time period to define a quantity of time to block notifications relating to the event notification.

11. A method for hands free building automation notifications, comprising:
    receiving, by a computing device, a notification of an event from a building automation system, the received notification having a plurality of attributes related to the event;
    modifying, by the computing device, the notification to include only pre-defined ones of the plurality of attributes of the received notification and to abbreviate one or more of the pre-defined attributes to accommodate a relatively smaller user interface of a wearable device, wherein the pre-defined ones of the plurality of attributes include less than all of the plurality of attributes of the notification and two or more of a source of the event notification that defines an issue detected by the building automation system, a priority level corresponding to the event notification, a category that defines a type of the notification, and trend information that defines data over a period of time corresponding to the event notification;
    transmitting, by the computing device, the modified notification to the wearable device for display on the relatively smaller user interface of the wearable device;
    receiving feedback from the wearable device that includes a response selected by a user for responding to the event from the building automation system;
    transmitting the received feedback to a different wearable device;
    updating, by the computing device, the building automation system based on the feedback from the wearable device;
    updating, by the computing device, the modified notification based on the updated building automation system; and
    transmitting, by the computing device, the updated modified notification to the wearable device.

12. The method of claim 11, wherein the updating the building automation system includes categorizing a message for the notification based on a relationship between the message and the notification.

13. The method of claim 11, wherein the updating the building automation system includes generating a message relating to the notification to upload to the building automation system.

14. The method of claim 11, wherein modifying the notification includes generating an event table for the notification to categorize received data from the building automation system relating to the notification.

15. A wearable device for hands free building automation notifications, comprising:
    a user interface;
    a memory; and
    a processor configured to execute executable instructions stored in the memory to:
      receive a modified notification of an event corresponding to an event detected by
      a building automation system, the modified notification is tailored to be displayable on the user interface of the wearable device including abbreviating one or more of the plurality of attributes, wherein the modified notification does not include all of a plurality of attributes of the event and includes two or more of the following attributes of the event: a source of the event notification that defines an issue detected by the building automation system, a priority level corresponding to the event notification, a category that defines a type of the notification, and trend information that defines data over a period of time corresponding to the event notification;

display the modified notification on the user interface of the wearable device;

receive feedback by selecting, via the user interface of the wearable device, one of a plurality of predetermined responses for responding to the event.

16. The wearable device of claim 15, wherein the display of the modified notification includes a graphical representation of the event over a period of time.

17. The wearable device of claim 15, wherein the one of the plurality of predetermined responses comprises a selection to delay additional notifications relating to the event.

18. The wearable device of claim 15, wherein the one of the plurality of predetermined responses comprises a selection to generate a message to include within an event table.

19. The wearable device of claim 18, wherein the processor is configured to execute the executable instructions to transmit the message to the building automation system.

20. The wearable device of claim 15, wherein the one of the plurality of predetermined responses comprises a selection to flag a notification within an event table.

* * * * *